UNITED STATES PATENT OFFICE.

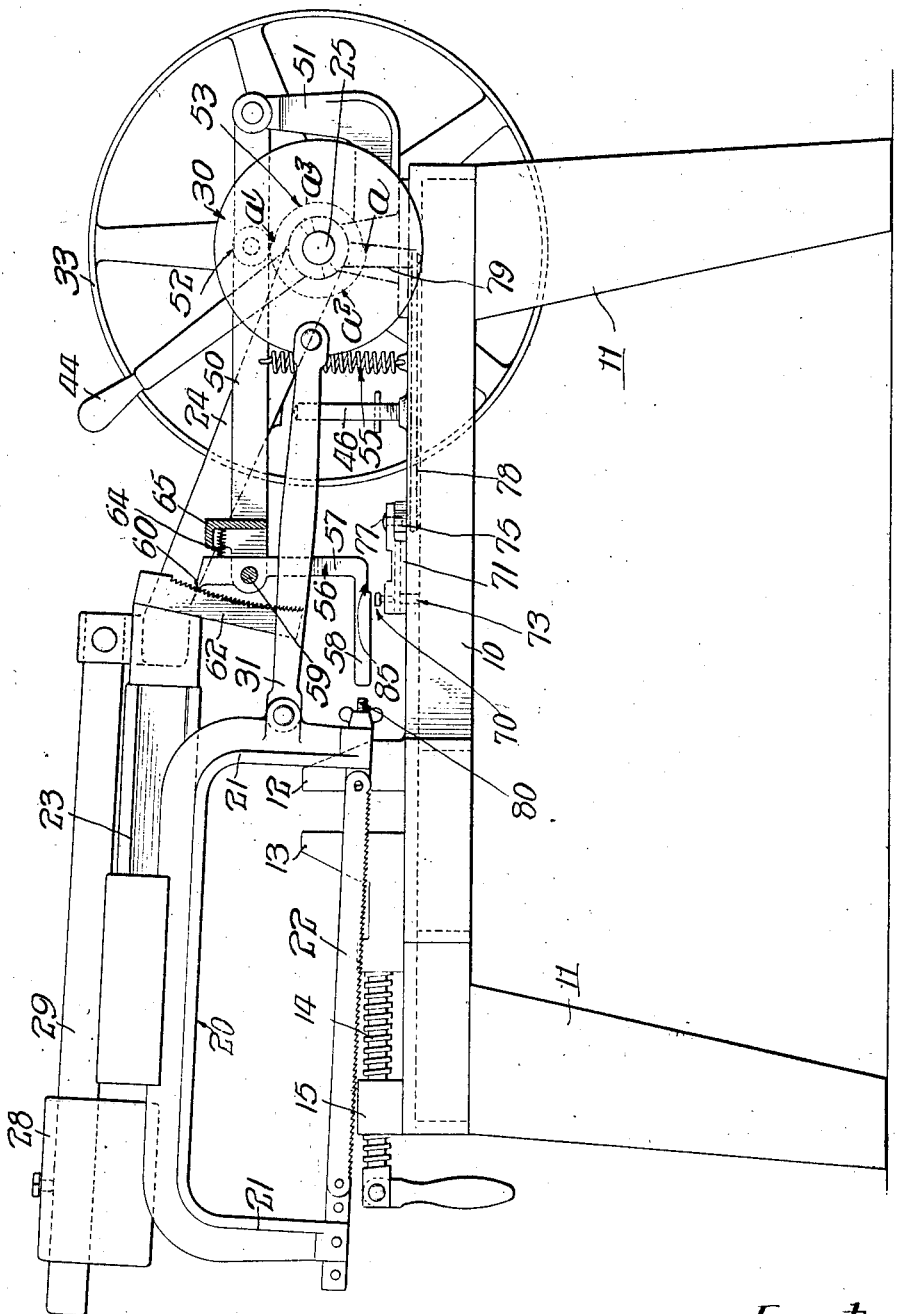

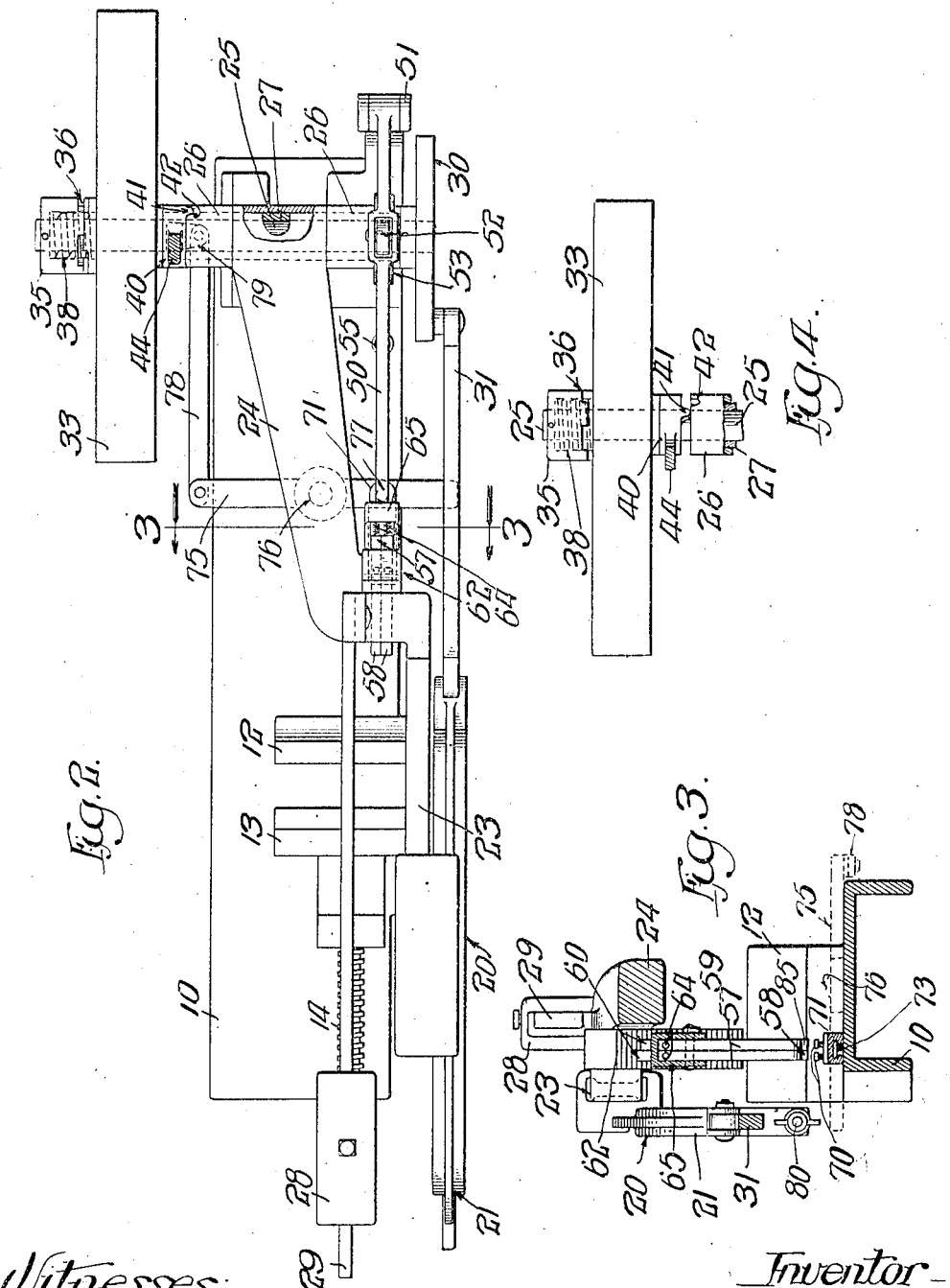

CHARLES RASMUSSEN, OF RACINE JUNCTION, WISCONSIN.

POWER HACKSAW-MACHINE.

No. 927,751.              Specification of Letters Patent.           Patented July 13, 1909.

Application filed January 20, 1908. Serial No. 411,595.

*To all whom it may concern:*

Be it known that I, CHARLES RASMUSSEN, a citizen of the United States, and a resident of Racine Junction, in the county of Racine and State of Wisconsin, have invented certain new and useful Improvements in Power Hacksaw-Machines; and I do hereby declare that the following is a full, clear, and exact description thereof, reference being had to the accompanying drawings, and to the characters of reference marked thereon, which form a part of this specification.

This invention relates to improvements in power hack-saw machines, and the invention relates more specifically to an improved means for lifting and holding the saw out of contact with the work during the idle or non-cutting stroke thereof, thereby avoiding wear on the saw during its inoperative stroke, and also permitting the saw to cool when thus out of contact with the work.

Among the objects of the invention is to provide an improved mechanism for lifting and sustaining the saw during its non-cutting or inoperative stroke which will operate with certainty to lift the saw and hold it away from the work, while permitting the saw to freely descend to the work at the beginning of the cutting stroke thereof.

A further object of the invention is to provide means for sustaining the saw after it has reached a predetermined position, as when it has completely severed the stock.

Other objects of the invention will appear from the subjoined description.

The invention consists in the matter hereinafter set forth and more particularly pointed out in the appended claims.

In the drawings:—Figure 1 is a side elevation of a power hack saw showing my improvements applied thereto. Fig. 2 is a plan view thereof, with parts shown in section. Fig. 3 is a detail section, taken on line 3—3 of Fig. 2. Fig. 4 is a detail of the clutch for connecting the driving shaft with the power and the cam collar for actuating the same.

As shown in the drawings, 10 designates the base-plate of the machine which is supported on legs 11.

12 and 13 designate respectively the stationary and movable jaws of the work-holding vise, and 14 designates a feed screw for advancing and retracting the movable jaw toward and from the stationary jaw, said feed screw being rotatively connected at one end with the movable jaw and engaging near its other end a nut 15 stationary with the base-plate.

20 designates the saw frame, between the vertical legs or members 21, 21 of which the saw 22 is stretched.

23 is a horizontal saw guide on which the horizontal part of the saw frame has sliding engagement; and said saw guide is movable vertically to permit the saw to be raised from and lowered toward the work. The saw guide, as shown, is swingingly mounted, it being for this purpose fixed to or formed on the forward end of a vertically swinging arm 24 which is pivotally mounted on the rotative driving shaft 25 of the machine. Said driving shaft is mounted in bearings 26, 26 rising from the base-plate 10. Preferably said arm 24 is not mounted directly on the shaft 25 but is pivoted to a bushing 27 that surrounds said shaft and is fixed to said bearings 26.

28 designates a weight which is adjustably fixed to the forward end of a bar 29 that extends forwardly from the guide supporting arm 24 at one side and above the level of the saw frame guide. By adjusting said weight longitudinally of the bar 29, the pressure with which the saw bears on the work may be regulated as desired.

The saw frame and saw are reciprocated through the medium of a crank disk 30 fixed to one end of the shaft 25, and a pitman 31 pivotally connected at one end with the crank-disk and at its other end with the saw frame.

33 designates a belt pulley which is fixed to the driving shaft 25, and through the medium of which power is transmitted to the machine for reciprocating the saw. The pulley 33 is normally loose on the driving shaft and is adapted to be locked thereto by a clutch device now to be described.

35 designates a collar fixed to the end of the driving shaft laterally outside the belt pulley. The inner end of said collar and the adjacent end of the hub of the pulley are provided with interfitting clutch teeth 36, and said clutch teeth are held normally separated by a spiral spring 38 surrounding the shaft within the enlarged bore or recess of the collar and interposed between the bottom of said recess and the end of the pulley hub. The driving pulley is pressed toward the clutch collar 35 to engage or connect the clutch teeth by means of a cam collar 40 which is mounted to have rocking movement on the bushing 27 between one of the bearings 26 and the inner end of the pulley hub. The inner end of said cam collar is formed with angularly separated, tapered cam projections 41 which are adapted to fit within correspondingly shaped recesses 42 in the adjacent end of the bearing 26, as shown in Fig. 2, in one position of the cam collar, or the position which the collar occupies when the clutch teeth are separated by the spring 38. Angular displacement or rocking of the cam about its axis shifts said cam projections 41 from the recesses 42 of the stationary bearing into contact with the end face of the bearing, with the result of forcing said collar and pulley outwardly, against the action of the spring 38, and engaging the clutch teeth. The cam collar is provided with a hand-lever 44 by which it may be rocked to effect the engagement of the clutch teeth in the manner described.

46 designates a vertical stop-stud which has screw-threaded engagement with the base-plate of the machine beneath the arm 24 and is arranged to adjustably limit the downward movement of said guide and the saw frame supported thereby.

50 designates a vertically swinging lever which is hinged at its rear end to a standard 51 rising from the base-plate of the machine. Mounted on said lever between its ends is a bearing roller 52 which rides on the periphery of a cam 53 that is fixed to the driving shaft 25 between the crank disk 30 and adjacent bearing 26. The periphery of the cam 53 is divided by an ascending portion $a$ and a descending portion $a^1$ into a higher portion $a^2$ and a lower portion $a^3$; and said parts of the periphery of different radii are of substantially equal lengths, each being approximately one half of a circle. A spiral spring 55, attached at its upper end to the lever 50 and at its lower end to the base plate 10, in front of the driving shaft, serves to hold the roller of said lever against the periphery of the cam 53. Pivoted to the forward end of said lever adjacent to the rear end of the saw frame guide and support are two L-shaped dogs 56, each comprising a vertical portion 57 and a horizontal or tail portion 58. The said dogs are arranged side by side and are pivoted near the upper ends of the vertical portions thereof between fork arms of said lever 50 by means of a pivot pin 59 extending transversely through the dogs and fork arms. The upper ends of said dogs, above the lever 50, are formed with upwardly and forwardly directed teeth 60 which engage the rearwardly facing teeth of an upright ratchet bar 62 attached to the rear end of said saw frame guide and support. The upper or toothed ends of said dogs are pressed toward the ratchet teeth by means of spiral, expansively acting springs 64 arranged in a box 65 integral with and rising from the forward end of said lever 50. The horizontal or tail portions of the dogs 56 are arranged over and are adapted to engage, when in their lowermost positions, tripping studs 70 which may be supported in any suitable manner on the base-plate of the machine. As herein shown, said tripping studs are supported on a sliding block 71 mounted on the base-plate beneath the dogs and so arranged as to be movable longitudinally of the base-plate. The tripping studs have screw-threaded engagement with the block, thus permitting them to be raised and lowered to adjust them properly to the dogs. The sliding block is guided in its horizontal movement by a guide-pin 73 extending upwardly from the base-plate and entering a downwardly opening guide groove in the bottom of the block. The said sliding block 71 is connected with the cam collar 40 of the belt pulley clutch in such manner that when the collar is rocked on its axis to disconnect the driving shaft from the power the block is slid rearwardly to carry the dog tripping studs rearwardly, for a purpose hereinafter to be described. The operative connections between said block 71 and said clutch cam collar comprises a horizontally swinging lever 75 that is mounted transversely on the base-plate and is pivoted between its ends thereto by a vertical pivot pin 76, is pivotally connected at one end with said block by means of a pivot pin 77, and is pivotally connected at its other end with the forward end of a link 78, which latter is pivotally connected at its rear end with an arm 79 rigid with and extending downwardly from said cam collar. The said clutch is arranged to be automatically operated to disconnect the driving shaft from the belt pulley when the saw reaches a predetermined low position, as, for instance, when the saw completely severs the work. This may be accomplished by extending the lever 75 laterally beyond its connection with the block 71 in position to be engaged by a part carried by the saw front, as for instance, the saw adjusting screw 80. The said screw, or equivalent part, engages the extended end of the lever 75 when the saw has reached its lowermost position and is at the limit of its draw or cutting stroke. When the end of said lever 75 is shifted rearwardly, therefore, by engagement with said screw 80 of the saw frame, motion is transmitted, through said lever and the link 78, to rotate the cam collar 40 in a direction to angularly shift the cam projections thereof out of line with the plain end faces of the adjacent bearing 26 (in which latter position they are shown in Fig. 4) into line with the V-shaped recesses thereof, whereupon the spring 38 operates to spread apart the clutch teeth of the pulley and clutch collar 35, as shown in Fig. 2.

The operation of the machine is as follows: The saw moves through its operative or cutting stroke, which is the draw or inward stroke thereof, as herein shown, while the bearing roller of the hinged saw controlling lever 50 is riding over the lower portion $a^3$ of the cam 53, and moves through its non-cutting stroke while said roller is riding on the higher portion $a^2$ of said cam. The forward end of said lever 50 is raised as the bearing roller passes upon the higher portion of the cam, as is evident, and the dogs 56 are likewise raised with their horizontal or tail portions out of contact with the tripping studs 70. When the dogs are thus freed from the tripping studs 70 the springs 64 force the upper or toothed ends of the dogs into engagement with the teeth of the ratchet bar 62, thus affording a connection between the lever 50 and the saw-frame guide through which said guide and the saw-frame are lifted. The said parts are thus lifted just before the saw begins its non-cutting stroke and are held in their elevated positions with the saw free from the work throughout said non-cutting stroke. When the saw reaches the end of its non-cutting stroke the roller of the said controlling lever 50 passes upon the lower portion of the cam 53 and lowers the dogs with their horizontal or tail portions in contact with the tripping studs 70. The contact of said tail portions of the dogs with said studs has the effect of swinging the upper or toothed ends of the dogs rearwardly out of engagement with the teeth of the ratchet-bar 62, thus permitting the saw to drop down into engagement with the work. During the succeeding or cutting stroke of the saw the bearing roller of the saw-frame controlling lever rides over the lower portion of the cam 53 and exerts no lifting effect on the saw-frame and the saw is pressed against the work by the force due to the weight of the saw-frame and guide and the weight 28; and the working pressure of the saw may be regulated by shifting the weight longitudinally of the weight supporting bar 29. As the saw approaches or reaches the end of its cutting stroke the bearing roller of the controlling lever 50 passes upon the raised portion of the cam 53, and raises the forward end of said lever. The first effect of raising the forward end of the said lever is to disengage the dogs from the tripping lugs 70, thereby permitting the upper toothed ends thereof to engage the teeth of the ratchet bar 62, under the action of their springs 64 and establish a connection between said lever and the saw frame guide by which the latter and the saw are lifted as the bearing roller of said lever passes fully on to the higher portion of the cam 53. In this manner, said saw is lifted at the end of each cutting stroke and held out of contact with the work throughout the non-cutting stroke, and is lowered into contact with the work at the beginning of each cutting stroke.

In order that the teeth of the ratchet bar may be spaced a distance apart to permit them to be made of sufficient strength to support the weight of the saw-frame and its guide, while at the same time insuring that the teeth of the dogs shall with certainty engage the ratchet teeth to provide a reliable lifting connection between the lever 50 and the saw-frame guide, the teeth of said dogs are shown as vertically separated a distance equal to approximately one-half of the distance between the ratchet teeth. With this construction, if the tooth of one dog fails to engage the proper tooth of the ratchet bar when the outer end of the lever 50 is raised, the other tooth will be in position to engage said ratchet tooth or the tooth next adjacent thereto, and thereby insure a reliable lifting connection between the dogs and ratchet bar. The same results may be secured by arranging the teeth of the dogs at the same level and arranging the teeth of the ratchet bar in two lateral rows with the teeth of one row out of line or staggered with respect to the teeth of the other row. In lieu of the arrangement of the dog and ratchet teeth described a single dog may be employed, the tooth of which is designed for engagement with ratchet teeth spaced closer together than herein shown. The construction herein illustrated, or its equivalent, is preferred, however, inasmuch as the wider spaced ratchet teeth may be made amply strong to sustain the weight or load thrown on the same when the saw frame and guide are lifted.

When the saw reaches its lowermost position, the saw adjusting screw 80, or other equivalent contact device carried by the saw-frame, strikes the end of the lever 75 and automatically disconnects the driving clutch and stops the machine.

It is desirable that provisions be made to maintain the dogs 56 engaged with the ratchet bar 62 after the completion of the last stroke of the saw, whereby the saw frame may be raised when the saw has completed its cut and held upwardly at any desired inclination by engagement of said dogs with the ratchet bar. This result is effected in the present instance by mounting the tripping studs 70 on the sliding block 71 before referred to and forming the lower faces of the horizontal or tail portions of the dogs with recesses 85, beneath which the tripping studs 70 are moved when the block 71 is shifted rearwardly either by the lever 44 or the automatic mechanism provided therefor. When said tripping studs are thus shifted beneath said recessed portions 85 of the dogs, the distance between the upper ends of said studs and the bottoms of the recesses is greater than the extent of rising and falling movement of the dogs, due to the action of the cam 53, wherefore the dogs are not brought into tripping contact with said studs and are not therefore tripped out of engagement with said ratchet bar. The saw frame and saw may now be raised to any desired height within the limit of the range of the ratchet and held in such position by engagement of the dogs with the ratchet bar. This construction renders it convenient for the operator in measuring the work to be cut, inasmuch as the saw may be hung or suspended close to the work. In the beginning of the operation of the machine the dogs are engaged with the ratchet bar at or near the lower end of the latter, depending upon the thickness of the stock being sawed. At the ends of the cutting strokes of the saw the dogs engage the ratchet bar at successively higher points and operate to lift the saw each time a definite distance to permit it to clear the work upon the succeeding non-cutting stroke. It is apparent that the movable tripping studs for the dogs may be employed independently of the automatic stopping mechanism, but its use in connection with such mechanism is advantageous inasmuch as it greatly facilitates the operation of the machine and renders it to the highest degree convenient and practical.

The saw controlling device described is exceedingly simple, compact and efficient for the purpose set forth. It is positive in its action, thereby insuring that the saw will be positively lifted during each non-cutting stroke and will be as positively disengaged at the end of each non-cutting stroke.

Changes may be made in the structural details without departing from the spirit of my invention and I do not wish to be limited to the illustrated construction except as hereinafter made the subject of specific claims.

I claim as my invention:—

1. In a power hack saw machine, the combination with a vertically swinging saw supporting guide, a saw carried thereby and means for reciprocating the saw, of means for lifting the guide and saw during the non-cutting stroke of the saw and arranged to release said parts to permit the saw to freely press against the work during its cutting stroke, and means located in position to be engaged by a movable part of the said machine as the saw reaches its lowermost cutting position to prevent releasing of the saw from said lifting means, whereby said lifting means operates to support the saw and guide after the final stroke of the saw.

2. In a power hack saw machine, the combination with a vertically swinging saw supporting guide, a saw carried thereby and mechanism for reciprocating the saw, of means for raising the guide and saw during the non-cutting stroke of the saw and arranged to release said parts to permit the saw to freely press against the work during its cutting stroke, comprising a vertically swinging lever, releasable lifting connections between said lever and guide arranged for engagement to lift the guide and saw when the lever is swung upwardly and to release said connections when the lever is swung downwardly, and means acted upon by a part movable with the saw and arranged to maintain the lifting connections between said lever and guide when the saw reaches its final cutting position.

3. In a power hack saw machine, the combination with a vertically swinging saw supporting guide, a saw carried thereby and mechanism for reciprocating the saw, of means for raising the guide and saw during the non-cutting stroke of the saw and arranged to release said parts to permit the saw to freely press against the work during its cutting stroke, comprising a vertically swinging lever, lifting connections between said lever and guide arranged for engagement to lift the saw and guide when the lever is swung upwardly, a tripping device acting on said lifting connections at the end of the non-cutting stroke of the saw to release the saw and means movable with the saw, acting on said tripping device to automatically throw it out of action.

4. Means for raising and supporting in a raised position, during the non-cutting stroke of the saw, the saw guide and saw of a power hack saw machine comprising a vertically movable saw guide, a ratchet carried thereby, a vertically swinging lever, a dog hinged to said lever adapted for engagement with said ratchet, means acting on said dog for holding it engaged with the ratchet when said lever is swung upwardly, and a tripping device adapted to be fixed to the frame beneath the said dog to engage with and trip said dog out of engagement with the ratchet when said lever is swung downwardly.

5. In a power hack saw machine, the combination with a vertically swinging saw supporting guide, a saw carried thereby and mechanism for reciprocating the saw, of means for raising the guide and saw during the non-cutting stroke of the saw and arranged to release said parts to permit the saw to freely press against the work during its cutting stroke, comprising a ratchet on the saw supporting guide, a vertically movable dog operated by the saw reciprocating mechanism adapted to engage said ratchet to lift said saw and guide and support the same during the non-cutting stroke of the saw, said dog having a horizontal member, and a tripping device fixed to the machine beneath the dog and operating on the horizontal member of said dog at the end of the non-cutting stroke of the saw to release the dog from the ratchet.

6. Means for raising and supporting in a raised position, during the non-cutting stroke of the saw, the saw guide and saw of a power hack saw machine comprising a vertically movable saw guide, a ratchet carried thereby, a vertically swinging lever, a dog carried by said lever adapted for engagement with said ratchet, means acting on said dog for holding it engaged with the ratchet when said lever is swung upwardly, and a tripping device arranged to act on said dog at the end of the non-cutting stroke of the saw to release it from the ratchet, said tripping device being movable out of the range of said dog, for the purpose set forth.

7. In a power hack saw machine, the combination with a vertically swinging saw supporting guide, a saw carried thereby and mechanism for reciprocating the saw, of means for raising and sustaining the guide and saw during the non-cutting stroke thereof and arranged to release said parts to permit the saw to freely press against the work during its cutting stroke embracing a tripping device arranged to act on said lifting and sustaining means at the end of the non-cutting stroke of the saw to release said guide and saw, and means for disconnecting the saw reciprocating mechanism from the saw, said tripping device being movable with said disconnecting means to an inoperative position.

8. In a power hack saw machine, the combination with a vertically swinging saw supporting guide, a saw carried thereby and mechanism for reciprocating the saw, of a ratchet on said guide, a vertically movable dog engaging said guide for raising and sustaining the saw during the non-cutting stroke thereof, a tripping device arranged to release said dog from the ratchet at the end of the non-cutting stroke of the saw, and means for disconnecting said saw from the reciprocating mechanism, said tripping device being movable with said disconnecting means to an inoperative position.

9. Means for raising and supporting in a raised position, during the non-cutting stroke of the saw, the saw guide and saw of a power hack saw machine comprising, in combination, a vertically movable saw guide, a ratchet carried thereby, a vertically swinging cam actuated lever, a dog pivoted to the inner end of said lever and having at its upper end a tooth adapted for engagement with said ratchet, means for holding the dog engaged with the ratchet, a tripping stud acting on the lower end of said lever to trip the dog out of engagement with said ratchet, and means for effecting vertical adjustment of said tripping stud.

10. Means for raising and supporting in a raised position, during the non-cutting stroke of the saw, the saw guide and saw of a power hack saw machine comprising, in combination, a vertically movable saw guide, a ratchet carried thereby, a vertically swinging cam actuated lever, a dog pivoted to the inner end of said lever and having at its upper end a tooth adapted for engagement with said ratchet, means for holding the dog engaged with the ratchet, a tripping stud acting on the lower end of said lever to trip the dog out of engagement with said ratchet, said dog being provided on its under face with a recessed portion, and means for moving said stud beneath the recessed portion of the dog to free the dog from the action of said stud.

11. In a power hack saw machine, the combination with a reciprocating saw frame, a rising and falling support and guide therefor, a rotative driving shaft, and connections for reciprocating said saw frame through rotative movement of said driving shaft embracing a clutch arranged to connect and disconnect the shaft from the driving power, of a cam carried by said driving shaft, a vertically swinging lever actuated by said cam, a ratchet on said support and guide, a dog pivoted to said lever adapted for engagement with said ratchet to lift and sustain said guide and saw frame during the non-cutting stroke of the saw, a tripping device connected with said clutch and adapted for engagement by the saw frame in a manner to be shifted thereby and to operate the clutch to disconnect the driving shaft from the driving power, and a tripping device movable with said first mentioned tripping device adapted for contact with said dog to trip the dog out of engagement with said ratchet at the end of the non-cutting stroke of the saw, the parts being so arranged that when said first mentioned tripping device is shifted by said saw frame the dog tripping device is freed from said dog, for the purpose set forth.

In testimony, that I claim the foregoing as my invention I affix my signature in the presence of two witnesses, this 15th day of January A. D. 1908.

CHARLES RASMUSSEN.

Witnesses:
CHRISTIAN JOHNSON,
VICTOR THERKELSEN.